United States Patent [19]

Chaney, Jr. et al.

[11] Patent Number: 5,015,542
[45] Date of Patent: * May 14, 1991

[54] ELECTROCHEMICAL CELL HAVING A SAFETY VENT CLOSURE

[75] Inventors: Earl J. Chaney, Jr., Medina; Manuel R. Malay, Brunswick; Thomas J. O'Hara, Bay Village; Alan D. Ayers, Westlake, all of Ohio

[73] Assignee: Eveready Battery Company, St. Louis, Mo.

[*] Notice: The portion of the term of this patent subsequent to Jun. 5, 2007 has been disclaimed.

[21] Appl. No.: 513,439

[22] Filed: Apr. 23, 1990

Related U.S. Application Data

[63] Continuation of Ser. No. 421,440, Oct. 13, 1989, abandoned.

[51] Int. Cl.$^5$ ............................................. H01M 2/12
[52] U.S. Cl. ........................................ 429/56; 429/82; 429/174
[58] Field of Search ................................. 429/53–56, 429/85, 89, 82, 72, 194; 220/203, 209, 367; 137/511, 339

[56] References Cited

U.S. PATENT DOCUMENTS

| | | | |
|---|---|---|---|
| 4,237,593 | 12/1980 | Wolf | 29/157 |
| 4,296,186 | 10/1981 | Wolf | 429/54 |
| 4,329,405 | 5/1982 | Zupancic | 429/56 |
| 4,338,382 | 7/1982 | Fritts | 429/53 |
| 4,397,919 | 8/1983 | Ballard | 429/53 |
| 4,437,231 | 3/1984 | Zupancic | 429/53 |
| 4,529,673 | 7/1985 | Zupancic | 429/53 |
| 4,592,970 | 6/1986 | Zupancic | 429/82 |
| 4,855,195 | 8/1989 | Georgopoulos | 429/7 |
| 4,931,368 | 6/1990 | Ayers et al. | 429/53 |

Primary Examiner—Anthony Skapars
Attorney, Agent, or Firm—Robert W. Welsh

[57] ABSTRACT

A non-resealable vent closure for a galvanic cell, such as a nonaqueous cell, which comprises a seal member force-fitted with a bushing having an upper portion terminating with a thinner walled lower portion and wherein said seal member is force-fitted within the lower portion of the bushing and the bushing is seated within and seals the vent orifice in the housing of the cell.

20 Claims, 2 Drawing Sheets

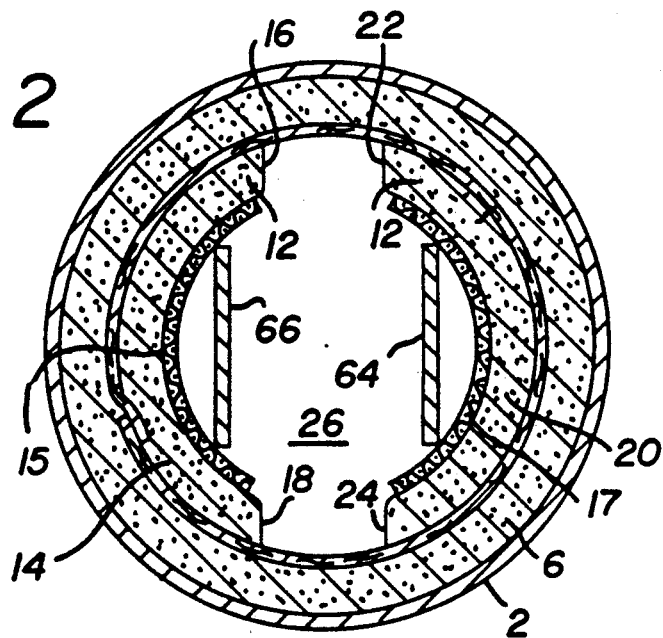
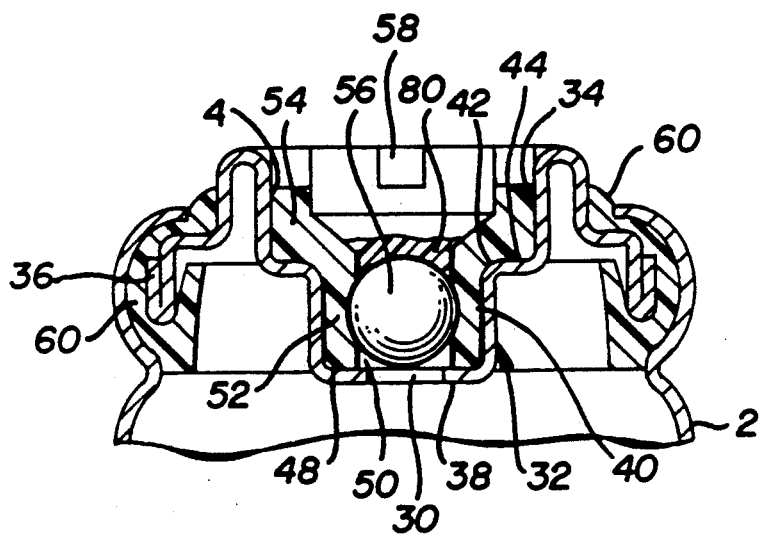
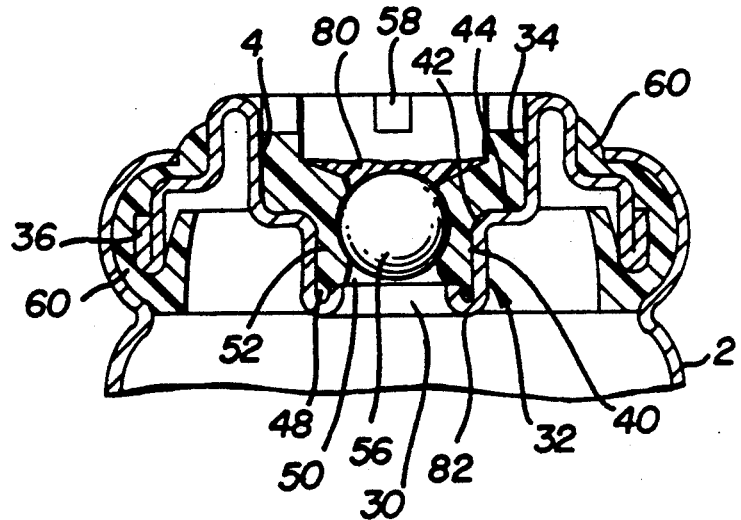

ELECTROCHEMICAL CELL HAVING A SAFETY VENT CLOSURE

This is a continuation of application Ser. No. 421,440, filed Oct. 13, 1989, now abandoned.

TECHNICAL FIELD

This invention relates to a non-resealable safety vent closure for galvanic cells, such as nonaqueous liquid oxyhalide cells.

BACKGROUND ART

Galvanic cells may generate large quantities of gas under certain conditions during use. Since many such cells are required to be tightly sealed in order to prevent loss of electrolyte by leakage, high internal gas pressures may develop. Such pressures may cause leakage, bulging or possible rupture of the cell's container under abusive conditions if not properly vented.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seal provided around the peripheral edge portions of the vent orifice and for compressing and deforming the resilient ball into a flattened configuration forming a normally fluid-tight seal between the flattened ball and the valve seal. The resilient ball is capable of undergoing further temporary deformation upon the build-up of a predetermined high internal gas pressure inside the container so as to momentarily break the seal and allow gas to escape through the vent orifice.

However, with the continuing development of portable electrically powered devices such as tape recorders and playback machines, radio transmitters and receivers, and the like, new types of reliable, long service life cells or batteries have been developed. These newly developed electrochemical cell systems provide a long service life by utilizing highly reactive anode materials such as lithium, sodium and the like, in conjunction with high energy density nonaqueous liquid cathode materials and a suitable salt.

It is disclosed in the literature that certain materials are capable of acting both as an electrolyte carrier, i.e., as solvent for the electrolyte salt, and as the active cathode for a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 63rd Edition, The CRC Press Inc., Boca Raton, Fla., 1982–1983. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example, such nonaqueous cathode materials would include sulfur monochloride, sulfur monobromide, selenium tetrafluoride, selenium monobromide, thiophosphoryl bromide, vanadium pentafluoride, lead tetrachloride, titanium tetrachloride, tin dibromide dichloride and tin tribromide chloride.

It has been found that when employing high energy density liquid cathode materials in nonaqueous cell systems, the cells exhibit higher voltages than cells employing conventional aqueous systems which results in fewer cell units being required to operate a particular battery-powered device. In addition, many of the oxyhalide and halide nonaqueous cells display relatively flat discharge voltage-versus-time curves. Thus these cells can be employed to produce batteries that will provide a working voltage closer to a designated cut-off voltage than is practicable with some conventional aqueous systems which generally do not exhibit flat discharge voltage-versus-time curves.

However, one possible disadvantage in the use of oxyhalide and halide liquid cathode nonaqueous cells is that it may be possible that during storage or use, some of the oxyhalide, halide or their reaction products may escape from the cell. This escape of liquids and/or gases could cause damage to the device employing the cell or to the surface of a compartment or shelf where the cell is stored. On the other hand, if the seal of the cell is effectively permanently secured, then it is possible that the build-up of internal pressure within the cell under abuse conditions could cause the cell's container to rupture which may cause property and/or bodily damage. To prevent rupture of the cell's container from possible internal pressure build-up caused under abusive conditions, such as charging and exposure to a high temperature environment, it is necessary to vent the cell at some predetermined pressure. It has been reported that some oxyhalide cells such as those employing thionyl chloride and sulfuryl chloride should be vented at pressures below about 500 psi and preferably between about 150 and 300 psi.

U.S. Pat. No. 4,329,405 discloses a safety blow-out vent closure for galvanic cells, such as nonaqueous oxyhalide cells, which comprises the employment of a conductive tubular member secured to the cell's housing and surrounding a vent orifice in the cell's housing and wherein a deformable member is force-fitted in said vent orifice and adapted to at least partially be ejected from the vent orifice upon the build-up of a predetermined internal gas pressure within the cell. In some applications, the wall defining the vent orifice in the cover could be subjected to corrosion at the deformable member-wall interface. This corrosion could roughen the wall surface and thereby increase the coefficient of friction between the deformable member and the wall of the vent orifice thereby resulting in the venting of the cell at unpredictable pressures. To overcome this potential problem, U.S. Pat. No. 4,529,673, discloses the use of a corrosion-resistant liner disposed at the interface of the wall defining a vent orifice and a force-fitted member. However, during storage and discharge some electrolyte may at times leak at the interface of the wall defining the vent orifice and the corrosion-resistant liner. To overcome this possibility, U.S. Pat. No. 4,592,970 discloses the use of a sealant at the interface of the wall defining the vent orifice and the liner.

When using thin-walled cylindrical-shaped liners, the insertion of the force-fitted member into the liner has been found to be troublesome. Since the liner has a straight wall cross-section, the only feature in this seal design which can restrain the downward movement of the liner during insertion of the force-fitted member is the bottom support ledge, if any, in the wall defining the vent orifice. This was found to be inadequate because the leading end of the liner tends to be extruded through the vent orifice upon insertion of the force-fitted member. In some instances, the leading edge of the liner can collapse. In these instances, the force-fitted member is prevented from being fully inserted into the liner, thereby resulting in an inadequate seal.

It is, therefore, an important object of this invention to provide a non-resealable safety vent closure for electrochemical cells, specifically oxyhalide cells, that will vent at a predictable, safe pressure.

It is another object of this invention to provide a non-resealable safety vent closure for cylindrical cells employing, for example, liquid oxyhalides as the active cathode material and having reduced electrolyte leakage characteristics.

It is another object of this invention to provide a non-resealable safety vent closure for nonaqueous cells that is inexpensive to manufacture and easy to assemble.

The foregoing and additional objects will become fully apparent from the following description and the accompanying drawings.

DISCLOSURE OF THE INVENTION

This invention relates to an electrochemical cell comprising active components of the cell assembled within a housing, said housing comprising a container having an open end closed by a cover and having at least one vent orifice defined by a wall in said housing; a bushing defining an axial opening comprising an upper portion terminating with a thinner walled lower portion, said bushing disposed within and against the wall defining the vent orifice in said housing; a seal member having a circumference smaller than the circumference of the opening defined in the upper portion of the bushing and larger than the circumference of the opening defined in the lower portion of the bushing, said seal member force-fitted within the lower portion of the bushing to seal the cell, and wherein at least one of said bushing and said seal member is resiliently deformable such that said seal member will be at least partially expelled from the vent opening upon a predetermined internal gas pressure build-up within the cell to provide a vent for the cell.

Suitable corrosion-resistant materials for the bushing for use in the invention include nylon, ceramic, polyethylene, polypropylene, polytetrafluoroethylene, fluorinated ethylene-propylene copolymer, perfluoroalkoxy polymer, ethylene-fluorinated ethylene copolymer, glasses and metals. In some cell applications, it would be preferable to use a resiliently deformable bushing. It is understood that the selection of the proper material will depend on the electrochemical system employed in order to insure that it will be corrosion resistant to the cell components. For oxyhalide cells, the bushing could preferably be made of Tefzel which is a trademark of E. I. DuPont de Nemours & Co., Wilmington, Del., for ethylene-tetrafluoroethylene copolymer.

The seal member could be made of metals, glass or ceramics but could be resiliently deformable and made of a material or coated with a material that is chemically resistant to the cell's components. If the seal member is resiliently deformable, the material of which it is made can be selected from the group consisting of the materials recited above and including elastomeric materials such as flurocarbon rubbers, ethylene-propylene rubber, neoprene rubber, and butyl or chlorobutyl rubbers. When the deformable material forming the seal member is to be coated with a chemically inert material, the said deformable material can be selected from the group consisting of nylon, hard rubber and the like. Suitable materials for use in this invention but not suitable for some of the oxyhalide cell systems are nylon, polypropylene, polycarbonate, acrylic polymers and the like. Preferably, the seal member should have a smooth spherical configuration and the inner surface of the bushing should be substantially smooth.

The safety vent closure of this invention using a seal member can be made to vent at any predetermined pressure build-up within the cell by regulating the size of the vent opening in the bushing with respect to the size of the seal member, the material of which the seal member is made, the degree of deformation required of the seal member and/or corrosion-resistant bushing, the thickness and material of which the corrsion-resistant bushing is made, and the shapes of the vent opening and the seal member. In the practice of this invention, the seal member can be inserted rapidly into the orifice with a minimum of force to attain a reliable and predictable safety vent closure. The use of a controlled height dead-stop ram to insert the seal member would be most desirable for automatic assembly operations.

The bushing for use in this invention would compriise an upper portion and a lower portion in which the cross-sectional wall of the upper portion would be thicker than the cross-sectional wall of the lower portion and wherein the circumference of the opening defined in the upper portion would be greater than the circumference of the opening defined in the lower portion of the bushing. If desired, at least a segment of the inner wall of the upper portion could be tapered so that the seal member, such as a glass sphere, could be guided into the lower portion of the bushing to seat within the opening. For example, for a cell of 0.475 inch diameter and 1.64 inch height, the thickness of the cross-sectional wall of the upper portion could be from 0.020 to 0.070 inch, while the thickness of cross-sectional wall of the lower portion could be from 0.004 to 0.030 inch.

In one embodiment, the vent orifice would be disposed in the cover and the wall defining the vent orifice could be extended downward and bent into a U-shaped bottom into which the leading edge of the lower portion of the bushing could be inserted and mechanically secured therein. In another embodiment, the wall defining the vent orifice could be terminated with a support flange so that the leading edge of the lower portion of the bushing could rest on the support flange during assembly.

If desirable, a layer of sealant could be disposed between the wall of the orifice and the bushing to prevent leakage of the electrolyte at this interface. Many electrolytes have a propensity for creeping along component parts of a cell and eventually may find a path to the outside of the cell. Electrolyte leakage not only reduces the capacity of the cell but renders the cell unmarketable in the conventional retail trade. Suitable sealant materials for use in this invention are asphalt, grease and wax such as halocarbon wax which is a saturated low-molecular weight polymer of chlorotrifluoroethylene having the general formula: $-(CH_2CFCl)_n-$; adhesives such as cyanoacrylic polymers, polyamides, vinylidene fluoride-hexafluoropropylene polymers, epoxy or any material which is resistant to moisture, having reasonable adhesion to the cell's housing and/or the bushing, chemically resistant to the cell's components, and can be easily applied. The sealant layer can be applied to the wall defining the orifice and/or the bushing prior to or when the bushing is disposed adjacent the wall of the orifice in the housing. Although a layer of sealant could be used, the design of the bushing with the upper portion extended to be flush or above the top surface of the vent orifice will effectively eliminate any electrolyte from contacting the interface of the bushing and the wall defining the vent orifice in the housing during filling of the electrolyte into the cell. The top edge of the upper portion of the bushing could contain one or more grooves or notches to provide a vent passage in the event an object is positioned across the vent orifice and upper edge of the bushing. In this embodiment, gas could escape through the groove or notch if an object is placed over the top edge of the bushing.

The non-resealable safety vent closure of this invention preferably can be employed with all size cells and is ideally suited for liquid cathode cell systems employing, for example, a liquid oxyhalide. In addition to providing an excellent and effective safety venting means, the invention also permits the initial assembling of the solid components of a cell within a container that can be closed in a conventional manner before adding the cell's liquid component. When the cell's liquid component is an oxyhalide-based liquid cathode, such as thionyl chloride or sulfuryl chloride, then these corrosive liquids can be injected into the cell's housing through the small orifice in the bushing and cover, e.g., by vacuum filling, after the cell cover is secured to the container. This will effectively eliminate the corrosion of crimping equipment used to close the cell as well as eliminating contamination at the interfaces of the container-gasket and gasket-cover of the cell by the oxyhalide. When using vacuum filling techniques to inject the electrolyte into the cell, a layer of sealant at the interface of the vent orifice and bushing will effectively prevent any of the electrolyte from being drawn up between the bushing and the orifice in the cover.

A cell for use in this invention can be of the split internal anode/outer cathode collector construction as described in U.S. Pat. No. 4,032,696 or the split internal cathode collector construction as described in U.S. Pat. No. 4,048,389, said U.S. Pat. Nos. 4,032,696, and 4,048,389 being incorporated herein by reference.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, the CRC Press Inc., Boca Raton, Fla.; 1982-1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Anodes suitable for use in nonaqueous liquid cathode cell systems can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using a lithium anode, the anode may be coated with a vinyl resin as disclosed in U.S. Pat. No. 3,993,501, said patent incorporated herein by reference.

The cathode collector for use in nonaqueous liquid cathode cell systems has to be electronically conductive so as to permit external electrical contact to be made with the active cathode material and also provide extended area reaction sites for the cathodic electrochemical process of the cell. Materials suitable for use as a cathode collector are carbon materials and metals such as nickel, with acetylene black being preferable. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Of importance in selecting the material for the cathode collector is to select materials that will be chemically stable in the cell system in which they are to be used.

A solute for use in liquid cathode cell systems may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets.

The basic concept is set forth in the chemical literature (Journal of the Franklin Institute, Vol. 226, July/December, 1938, pages 293-313 by G. N. Lewis).

A suggested reaction mechanism for the manner in which these complexes function in a solvent is described in U.S. Pat. No. 3,542,602 wherein it is suggested that the complex or double salt formed between the Lewis acid and the ionizable salt yields an entity which is more stable than either of the components alone.

Typical Lewis acids suitable for use in conjunction with liquid oxyhalide cathodes include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are tetrahydrofuran, 1,3-dioxolane, 3-methyl-2-oxazolidone, propylene carbonate, $\gamma$-butyrolactone, sulfolane, ethylene glycol sulfite, dimethyl sulfite, benzoyl chloride, dimethoxyethane, dimethyl isoxazole, diethyl carbonate, sulfur dioxide and the like.

Suitable separators for use with liquid cathodes in nonaqueous cells are the woven or nonwoven glass separators.

The container of the cell could be made of stainless steel, iron, nickel, plastic, coated metals or some other suitable material.

Some preferred combinations of nonaqueous cathode materials and anodes would be as follow:

(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

It is to be understood that the safety vent closure of this invention could be used in other cell systems such as, for example, Leclanche dry cells, zinc chloride cells, lithium-$MnO_2$ cells, lithium-iron sulfide cells, alkaline-$MnO_2$ cells, nickel-cadmium cells, and lead-acid cells.

The present invention will become more apparent from the following description thereof when considered together with the accompanying drawing which is set forth as being exemplary of embodiments of the present invention and is not intended in any way to be limitative thereof and wherein.

BRIEF DESCRIPTION OF THE DRAWING

FIG. 2 is a horizontal cross-sectional view taken along line 2—2 of FIG. 1.

FIG. 3 is an enlarged vertical cross-sectional view of the cell cover and the cell container of the electrochemical cell shown in FIG. 1, which shows in detail the cell cover and the vent bushing of the cell.

FIG. 4 is an enlarged cross-sectional view of another embodiment of a cell cover and cell container of an electrochemical cell which shows in detail the cell cover and the vent bushing of the cell.

DESCRIPTION OF THE PREFERRED EMBODIMENTS

Figure 1:
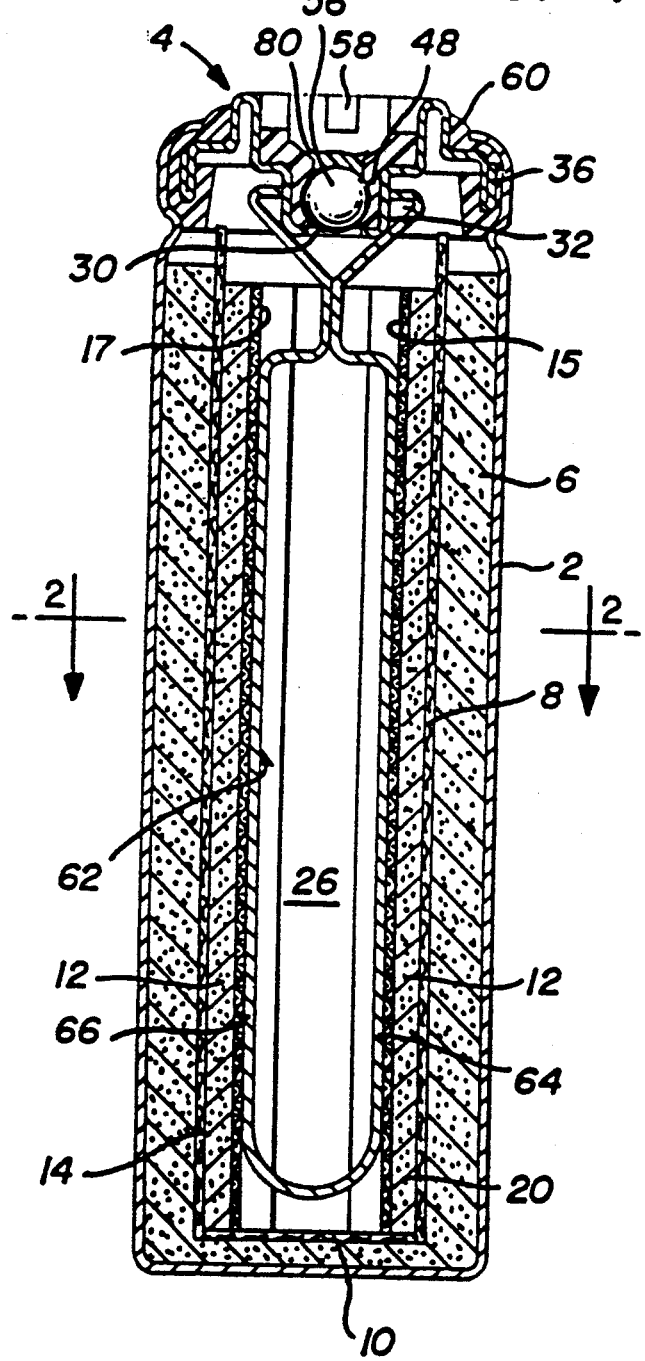
FIG. 1 is a vertical cross-sectional view of an electrochemical cell made in accordance with the present invention.

The cell housing in FIG. 1 comprises a cylindrical cell container 2 having an open end that is closed by a cell cover 4. A cathode collector 6 is in contact with the inner upstanding circumference of the cell container 2, thereby adapting the container 2 as the cathodic or positive terminal for the cell. Exposed within and in contact with the inner circumference of cathode collector 6 is a separator liner 8 with a bottom separator or disk 10. If desired, the cathode collector material could be extruded within the container 2, rolled with the container material or composed of one or more segments to form a cylindrical tube thereafter placed in the container.

A two-member anode 12 shown in FIGS. 1 and 2 is comprised of a first half cylindrical annular member 14 having flat end faces 16 and 18 and a second half cylindrical annular member 20 having flat end faces 22 and 24. When the flat end faces of each cylindrical half member are arranged in an opposing fashion, as shown in FIGS. 1 and 2, an axial cavity 26 is defined between the cylindrical half annular members 14 and 20.

Cathode collector 6 has to be electronically conductive so as to permit external contact to be made with the active cathode material and also to provide extended area reaction sites for cathodic electrochemical processes of the cell.

If desired, arcuate type backing sheets 15 and 17 can be disposed against the inner surface wall of the anode bodies 14 and 20, respectively, to provide uniform current distribution over the anode. This will result in a substantially uniform consumption or utilization of the anode, while also providing a substantially uniform spring pressure over the inner wall surface of anode 12.

Referring to FIGS. 1 and 3, cylindrical cover 4 comprises a circular cover orifice 30, vent bushing containment section 32, annular cap section 34 and circumferential cover flange 36. Vent bushing containment section 32 comprises circumferential support ledge 38, cylindrical sealing well 40 and rounded containment section shoulder 42. Circumferential support ledge 38, which is integrally joined to sealing well 40 at the bottom of said sealing well 40, is inwardly directed throughout its circumference toward the geometric axis of sealing well 40, thereby defining cover vent orifice 30. Rounded containment section shoulder 42 is located at the intersection of the top of sealing well 40 and cover ledge 44, the latter being the horizontal surface spanning the area between shoulder 42 and cap section 34. Rounded containment section shoulder 42 provides a smooth transition at that intersection without sharp edges. The cover is tightly sealed by conventional closing methods to container 2 with insulating gasket 60 therebetween.

It is preferred that cover 4 be formed by drawing a section of sheet metal, preferably a sheet of stainless steel. The cover orifice 30 can be formed in cover 4 by conventional punching or drilling.

Cylindrical bushing 48, which has a bushing orifice 50, is positioned in cover 4 so that one of its ends faces support ledge 38 and its cylindrical lower portion 52 is in contact with the inner surface of sealing well 40, while its cylindrical upper portion 54 is in contact with the inner surface of cap section 34. Vent bushing 48 comprises an upper portion 54 having its cross-sectional wall thicker than the cross-sectional wall of the lower portion 52. This embodiment of the bushing provides for easy manufacture and assembly of the cell. In particular, the upper thick vertical wall section 54 of the bushing 48 provides a circumferential gate to allow molding a very thin wall cross-section for the lower portion 52. The upper portion 54 also provides vertical support for the thinner lower section 52 during insertion of seal member 56 and prevents the end of the lower portion 52 from collapsing or from extruding into and through the bottom of vent orifice 30. The upper portion 54 will effectively isolate an electrolyte filling head from the cell's cover, thus protecting the cover which could be subject to corrosion by the electrolyte in humid environments. The upper portion 54 also facilitates the insertion of seal member 56 into the lower portion 52 since upper portion 54 is fully supported in the axial direction. The internal wall of upper portion 54 of bushing 48 is shown with a tapered segment at its lower end to facilitate the placing of the seal member 56 into the opening defined in the lower portion 52 of bushing 48.

Bushing 48 is shown with grooves or notches 58 in its upper portion 54 to provide a path to vent gases from within the cell in the event an object is placed over the top edge of bushing 48.

It is preferred that the outer periphery of cover 4 be bent through an obtuse angle, preferably through one approaching or equal to 180 degrees, to provide a cover flange 36, as shown in FIGS. 1 and 3. Such a construction, also referred to as a "roll-back" construction, provides a tight seal between cover 4 and cell container 2, since flange 36 upon assembly is compressed against gasket 60, which causes flange 36 to "follow" gasket 60 if any dimensional changes to the cell occur from thermal expansion and/or contraction.

Figure 5:
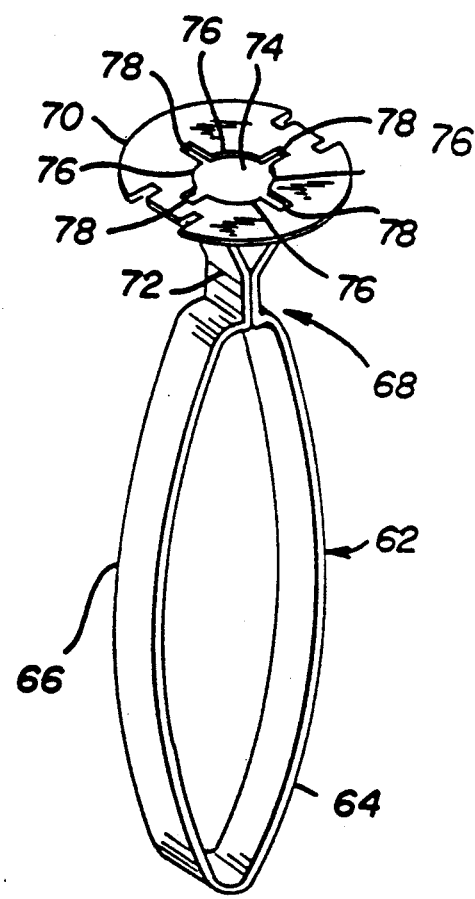
FIG. 5 is a perspective view of a spring collector shown in FIG. 1.

As shown in FIGS. 1 and 5, an electronically conductive spring strip 62, whose legs 64 and 66 are biased against the two screen-backed anode members 14 and 20, is electrically connected to cell cover 4 so as to make cover 4 the anodic or negative terminal of the cell. The ends of spring legs 64 and 66 can be electrically connected to cover 4 by welding the ends to cover 4. Alternatively, the geometric configuration of cell cover 4 allows use of a novel connection system. Referring to FIG. 5, there is shown a unitary spring collector assembly 68, comprising spring strip 62 and an annular fastening disk 70. Disk 70 is made of a resilient material, such as stainless steel. The spring legs 64 and 66 of spring strip 62 are joined, as by welding, in region 72. Disk 70 contains a castellated fastening hole 74, having four downwardly bent, radially and inwardly directed tabs 76 spaced at equal intervals about the circumference of hole 74 so as to define four radially directed slits 78. The diameter of hole 74 is smaller than the outside diameter of the cylindrical exterior surface of sealing well 40 that is disposed inside the cell. Thus, when disk 70 is forced axially onto the exterior surface of sealing well 40, the tabs in disk 70 will be forced to deflect slightly open. The deformed interference fit created by the spring tabs 76 of disk 70 thereafter firmly secures disk 70 to cover 4 in a tight compressive manner, thereby ensuring electrical connection of cover 4 with spring strip 62.

Bushing 48 preferably has an outside surface contour slightly larger than the inside surface contour of cover 4 so that vent bushing 48 can be press-fitted into the sealing well of cover 4 to yield an interference fit.

Vent bushing 48 is inserted into sealing well 40 until the bottom of upper portion 54 of bushing 48 abuts cover ledge 44. In this way, cover ledge 44 provides a positive stop for the vent bushing 48. In addition, the interference fit causes the outer surface of vent bushing 48 to be strongly forced against the inner surface of the wall defining the orifice in cover 4, which causes intimate contact between those two surfaces, thereby effectively preventing the transport of lithium ions from the inside to the outside of the cell via the interface between vent bushing 48 and sealing well 40.

It is also preferred for oxyhalide cells that the interior wall of the cover be coated with a sealant or adhesive prior to or after insertion of bushing 48. Such an adhesive more completely ensures the sealing of bushing 48 to the wall of cover 4 in the event of possible imperfections on the surface of bushing 48 or the interior wall of cover 4.

After insertion of vent bushing 48 into cover 4, disk 70 of spring collector assembly 68 is pressed onto the cylindrical outside of sealing well 40 of cover 4 and then cover 4 is inserted into its proper location inside annular gasket 60, which is located at the open end of cell container 2. It is preferred that gasket 60 be made of a copolymer of ethylene and tetrafluoroethylene and coated with a sealant of the same type preferably used to coat the interior wall of cover 4. At the time cover 4 is inserted into annular gasket 60, container 2 has already been supplied with a cathode collector 6, a separator liner 8 and bottom separator 10, a two-member anode 12, and backing sheets 15 and 17. As cover 4 is positioned with respect to gasket 60, the legs 64, 66 of the spring strip 62 are squeezed together and forced into the axial opening between the two screen-backed anode members 14 and 20, as shown in FIGS. 1 and 2. The inserted spring strip 62 resiliently biases the two anode members 14 and 20 via backing screens 15 and 17 so as to provide substantially uniform and continuous pressure contact over the inner wall of the anode members.

After inserting cover 2 inside gasket 60, the cell is closed and sealed using conventional closing techniques, so that cell container 2 and cell cover 4 make up a sealed cell housing. A fill head assembly is next pressed into vent bushing 48 and the cell is filled with electrolyte.

After the container is filled with the cathode-electrolyte, seal member 56 is disposed over vent bushing orifice 50 in bushing 48, and a ram member is used to force seal member 56 into orifice 50 to a predetermined depth.

After removal of the ram, if desired, a layer of sealant 80 may be disposed over seal member 56 to produce a fully sealed cell. Suitable sealing materials include halocarbon wax, asphalt, or any other material that is resistant to mositure and is applied easily. Preferably, the sealant material should be applied in liquid form and then allowed to solidify. The finished cell can then be encased in an outer jacket and covering cap section (not shown).

FIG. 4 shows another embodiment of a bushing and cover assembly that uses the same reference numbers for identical parts as shown in FIG. 3. The only difference is that the flange 38 of cover 4 is extended and bent into a U-shaped configuration 82 into which the leading edge of the lower portion 52 of bushing 48 is seated and then the U-shaped portion 82 is crimped to firmly secure lower portion 52 therein. This embodiment provides an alternate way to secure the bushing 48 so that during the electrolyte filling process, no electrolyte can become entrapped at the interface between bushing 48 and the inner surface of sealing well 40. In an alternate embodiment, instead of the U-shaped portion, a separate ring serving as an additional sealing member can be employed against the inside surface of the lower edge of lower portion 52. In this embodiment, the lower edge of lower portion 52 would be compressed between the ring and the lower extremity of the wall defining the orifice in the cover.

What is claimed:

1. An electrochemical cell comprising active components of the cell assembled within a housing, said housing comprising a container having an open end closed by a cover and having at least one vent orifice defined by a wall in said housing; a bushing defining an axial opening and comprising an upper portion terminating with a thinner walled lower portion said bushing disposed within and against the wall defining the vent orifice in said housing; a seal member having an external circumference smaller than the internal circumference of the opening defined in the upper portion of the bushing and larger than the internal circumference of the opening defined in the lower portion of the bushing; said seal member force-fitted within the lower portion of the bushing to seal the cell; and wherein at least one of said bushing and said seal member is resiliently deformable such that said seal member will be at least partially expelled from the vent opening upon a predetermined internal gas pressure buildup within the cell to provide a vent for the cell.

2. The electrochemical cell of claim 1 wherein the wall defining the vent orifice terminates with an inward flange and wherein the bottom edge of the lower portion of the bushing rests on said flange.

3. The electrochemical cell of claim 1 wherein the wall defining the vent orifice terminates with a U-shaped bend and wherein the bottom edge of the lower portion of the bushing seats within said U-shaped bend.

4. The electrochemical cell of claim 1 wherein the vent orifice is disposed in the cover and the top edge of the upper portion of the bushing is substantially flush-mounted with the top surface of the cover.

5. The electrochemical cell of claim 4 wherein the top edge of the upper portion of the bushing contains at least one notch.

6. The electrochemical cell of claim 4 wherein the top edge of the upper portion contains at least two-spaced apart notches.

7. The electrochemical cell of claim 1 wherein the vent orifice is disposed in the cover and the external surface contour of the bushing is similar to the internal surface contour of the wall defining the vent orifice so that the bushing seats within said vent orifice.

8. The electrochemical cell of claim 7 wherein the external surface contour of the bushing is larger than the internal surface contour of the wall defining the vent orifice so that the bushing is friction fitted within said vent orifice.

9. The electrochemical cell of claim 7 wherein at least a portion of the inner surface of the upper portion of the bushing has a tapered contour extending to the lower portion of the bushing.

10. The electrochemical cell of claim 9 wherein the top edge of the upper portion of the bushing is substantially flush-mounted with the top surface of the wall defining the vent orifice and wherein said top edge contains at least one notch.

11. The electrochemical cell of claim 10 wherein the wall defining the vent orifice terminates with an inward flange and wherein the bottom edge of the lower portion of the bushing rests on said flange.

12. The electrochemical cell of claim 10 wherein the wall defining the vent orifice terminates with a U-shaped bend and wherein the bottom edge of the lower portion of the bushing seats within said U-shaped bend.

13. The electrochemical cell of claim 1 wherein the bushing is selected from the group consisting of nylon, ceramic, polyethylene, polypropylene, polytetrafluoroethylene, fluorinated ethylene-propylene copolymer, perfluoroalkoxy polymer, ethylene-fluorinated ethylene copolymer, glasses and metals.

14. The electrochemical cell of claim 1 wherein the seal member is made of a material selected from the group consisting of polyethylene, polytetrafluoroethylene, fluorinated ethylene-propylene copolymer, perfluoroalkoxy polymer, ethylene-tetrafluoroethylene copolymer, nylon, polypropylene, polycarbonate, acrylic polymers, metals, glass and ceramics.

15. The electrochemical cell of claim 1 wherein a sealant is disposed at the interface of the bushing and the wall defining the vent orifice.

16. The electrochemical cell of claim 1 wherein a sealant is disposed over the seal member.

17. The electrochemical cell of claim 1 wherein the seal member is coated with a chemically inert material with respect to the cell's components.

18. The electrochemical cell of claim 1, which employs a cathode-electrolyte which contains at least one liquid oxyhalide selected from the group consisting of thionyl chloride, sulfuryl chloride, phosphorus oxychloride, thionyl bromide, chromyl chloride, vanadyl tribromide and selenium oxychloride.

19. The electrochemical cell of claim 18 wherein the seal member is glass and the bushing is ethylene-tetrafluoroethylene copolymer.

20. The electrochemical cell of claim 19 wherein the top edge of the upper portion of the bushing is substantially flush-mounted with the top surface of the wall defining the vent orifice and wherein the top edge of the bushing contains at least one notch.

* * * * *